United States Patent [19]

Tsui

[11] 3,774,157

[45] Nov. 20, 1973

[54] METHOD OF AND ARRANGEMENT FOR THE DISTRIBUTION OF TIMING PULSES IN AN ELECTRONIC DATA PROCESSOR

[75] Inventor: Frank Tsui, Boeblingen, Germany

[73] Assignee: International Business Machines Corporation, Armonk, N.Y.

[22] Filed: Nov. 26, 1971

[21] Appl. No.: 202,450

[30] Foreign Application Priority Data

Jan. 30, 1971 Germany................ P 21 04 427.9

[52] U.S. Cl. .............................. 340/172.5, 178/69.5

[51] Int. Cl. .............................................. G06f 5/06

[58] Field of Search .................. 340/172.5; 235/157; 178/69.5

[56] References Cited

UNITED STATES PATENTS

| | | | |
|---|---|---|---|
| 3,648,256 | 3/1972 | Paine et al. | 340/172.5 |
| 3,453,607 | 7/1969 | Cohler et al. | 340/172.5 |
| 3,576,396 | 4/1971 | Sloate | 340/172.5 X |
| 3,576,570 | 4/1971 | Meier | 340/172.5 |
| 3,609,698 | 9/1971 | McCormick | 340/172.5 |
| 3,575,752 | 4/1971 | Lyghounis et al. | 340/172.5 |
| 3,560,934 | 2/1971 | Ernst et al. | 340/172.5 |
| 3,643,223 | 2/1972 | Ruth et al. | 340/172.5 |

*Primary Examiner*—Paul J. Henon
*Assistant Examiner*—Mark Edward Nusbaum
*Attorney*—James E. Murray et al.

[57] ABSTRACT

This specification describes a system for distributing timing pulses in an electronic data processor which minimizes differences in propagation time delays between timing pulses in a timing bus system and data pulses in a data bus system. The system involves first determining the direction of transmission of the data pulses and thereafter transmitting the timing pulses in the same direction.

3 Claims, 5 Drawing Figures

METHOD OF AND ARRANGEMENT FOR THE DISTRIBUTION OF TIMING PULSES IN AN ELECTRONIC DATA PROCESSOR

BACKGROUND OF THE INVENTION

The invention relates to a method of and an arrangement for the distribution of timing pulses in an electronic data processor.

For cost reasons, electronic data processors comprise a number of identical processing units which are loaded with different microprograms, so that they can be personalized for the execution of specific functions. These identical processing units are interconnected by means of a bus system for transmitting data between the processing units and the main storage units. The propagation time of pulses in this bus system is appreciable in comparison with the delay time of circuits used in high-speed data processors. Because of this, differences in propagation times between data pulses from the processing units, or the main storage units, and timing pulses from the central clock for controlling transmission of signals along the bus system results in a synchronization problem that effects the operation of the data processor.

To be more specific, an electronic data processing system of the type being discussed consists of a number of essentially autonomous processing units which, in addition to being connected to main storage units by a data bus system, are also interconnected by a timing bus system. Synchronization and time control of data and instruction transmissions between the individual processing units and the storage units are effected by a timing pulse generator whose timing pulses are distributed to said units through the timing bus system. The pulse generator is normally arranged in the geometric center of the bus system so that the timing pulses can be applied to the center of the timing bus system and transmitted outwardly from the center in both directions. As shall be seen in detail later in the specification transmission of timing signals in this manner results in a tolerance problem between data and instruction signals on one hand and timing signals on the other. This tolerance problem is aggravated in so-called flexible system configurations where individual processing units or storage units can be either removed from or added to the system.

THE INVENTION

Therefore, in accordance with the present invention, a new method for the distribution of timing pulses in an electronic data processing system is proposed to minimize differences in the propagation time delays between timing pulses on the timing bus and data pulses on the data bus. In this method, the direction of transmission of the data pulses is first determined and the timing pulses are subsequently transmitted in the same direction.

An arrangement for applying this method includes a timing pulse generator connected to a pair of control gates for each timing pulse line where one gate is linked to one end and the other gate to the other end of the timing pulse line. The gates on each end are additionally connected to one latch circuit each, whose output signal opens the associated gate circuits for the applied timing pulses as a function of the output of a data direction control unit used to determine the direction of transmission of data pulses on the data bus. This output comprises complementary control signals to open one gate of a control gate pair for the timing pulses while closing the other gate of the pair so that the timing pulses propagate from one end of the timing buses to the other in the direction determined by the direction of transmission of the data pulses.

The primary advantage of this invention is that the data transmission of data signals is controlled by timing signals which, while not exactly "synchronous," are separated from each other by the propagation time on the connecting line between the data transmitter and receiver. In this manner the propagation time delays are made mutually compensating, with compensation also being effective for any variations of the system's configuration.

Therefore, it is an object of this invention to provide a new method and apparatus for improving the transmission of timing pulses in a data processing system.

DESCRIPTION OF THE DRAWINGS

The foregoing and other objects, features and advantages of the invention will be apparent from the following more particular description of the invention as illustrated in the accompanying drawings, wherein.

Figure 4:
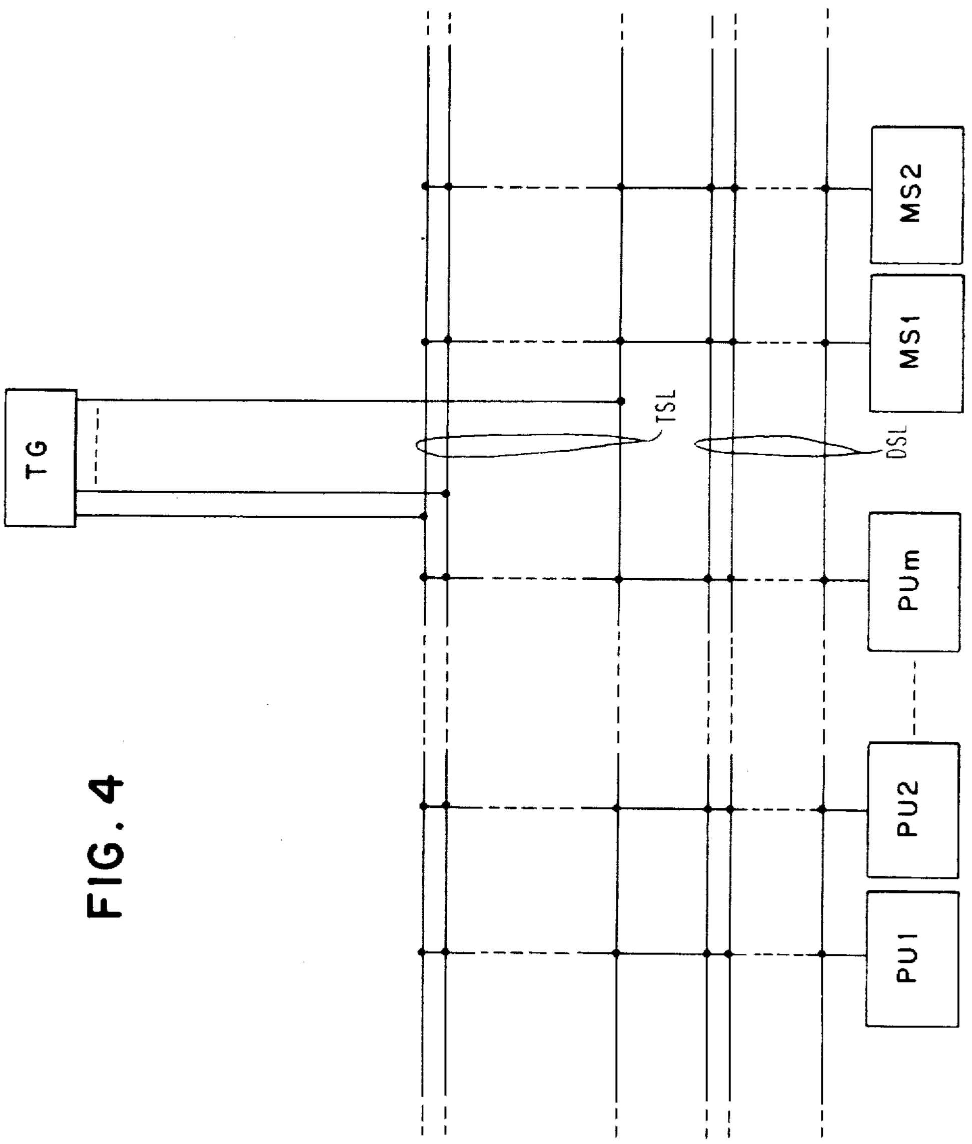
FIG. 4 is a block diagram of an electronic modulator data processing system with a timing pulse control in accordance with the prior art.

Referring first to FIG. 4, an electronic data processing system is shown consisting of a number of essentially autonomous processing units PU1 to PUm and main storage units which, in addition to being interconnected by a data bus system DSL, are also interconnected by means of a timing bus system TSL. Synchronization and time control of external data and instruction transmission between the individual processing units and the storage units are effected by a timing pulse generator TG whose timing pulses are distributed to said units through the timing bus system TSL. The pulse generator TG is normally arranged in the geometric center of the bus system, so that the timing pulses can be applied to the center of the timing bus system TSL. The processing units PU1 to PUm and the storage units MS1 and MS2 are arranged on circuit boards SK which are inserted into the bus system TSL and DSL via plug-in connectors.

Figure 5:
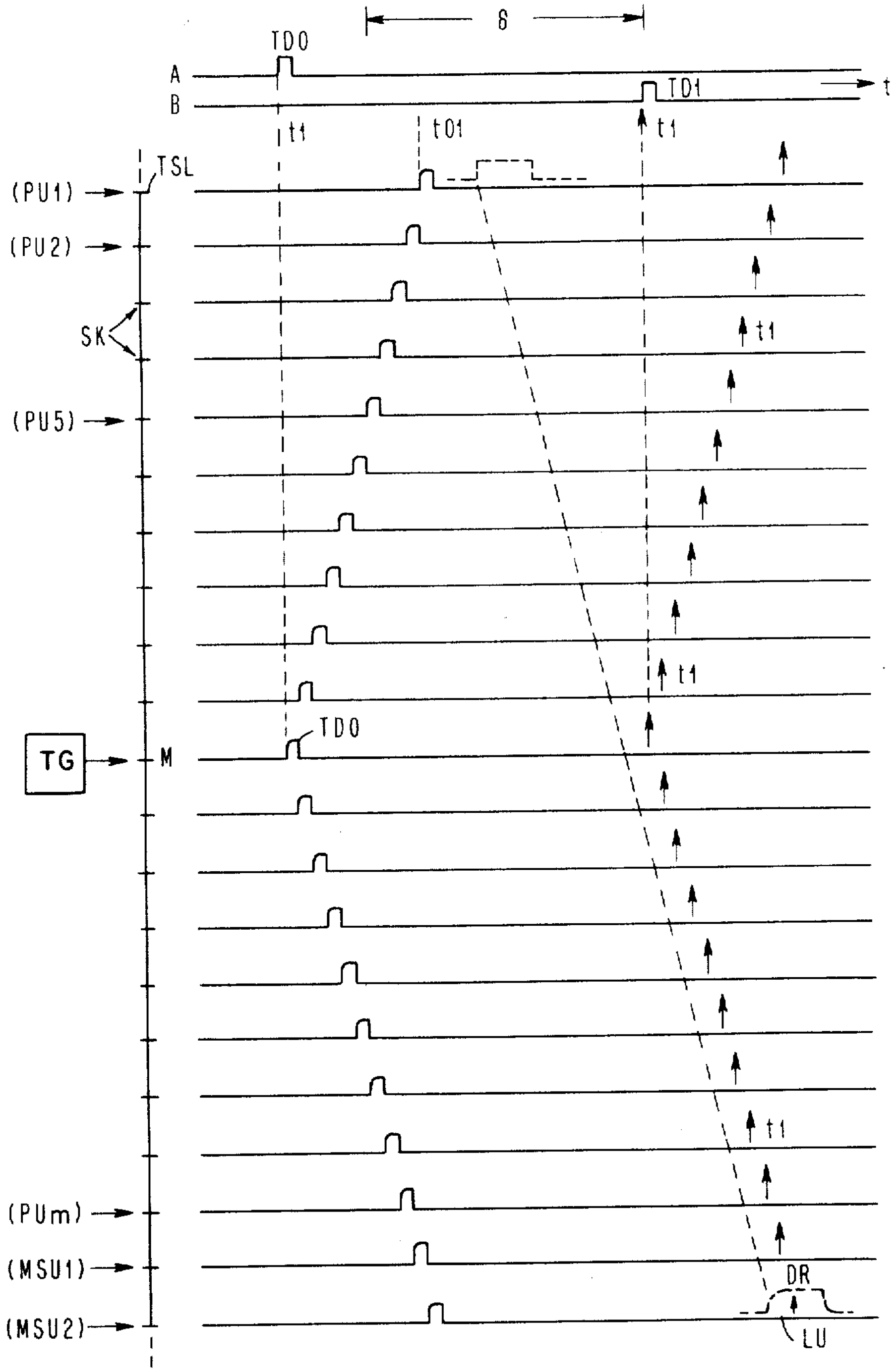
FIG. 5 is a schematic pulse diagram explaining the propagation times in a data processing system in accordance with FIG. 4.

Referring now to FIG. 5, the distribution of the timing pulses of the data processing system of FIG. 4 can be seen along with their propagation time differences for applications with all processing units PU1 to PUm and all storage units MS1 and MS2 included in the system. The top line A of FIG. 5 shows a timing pulse TD0 which at the time t0 is applied by timing pulse generator TG to the center of a line in timing bus system TSL in order to cause a transmitter, in this example, processing unit PU1 to transmit data. This pulse propagates itself on the line, reaching processing unit PU1 at time t01. In addition, a second timing pulse TD1 is applied to the center of the second line in the timing bus system TSL at the time t1, as is shown in line B of the diagram. This pulse is used to set the latch circuits (which are not shown) of the receiver, in this example storage unit MSU2, to take over the transmitted data.

The time at which the leading edge of the timing pulse TD1 reaches the storage unit MSU2 and causes latch circuits to be set is shown in FIG. 5 as a small vertical arrow LU. This arrow shows in a simplified form the earliest possible time at which data transmission may be transmitted. If, as in the example given, data is to be transmitted through the data bus from the processing unit PU1 to the main storage MS2, the propagation times in the system are as shown by the dashed lines in FIG. 5. The time at which data is transmitted from the processing unit PU1 is referred to as DT in FIG. 5. After a propagation time corresponding to the maximum delay time of the system this data signal is received at the time DR at the latch circuits for main storage unit MS2.

Even more unfavorable conditions are liable to occur in so-called flexible system configurations, where individual processing units PUi or storage units MSi can either be removed from or additionally incorporated in the system, so that the delay time is changed. These changes in the propagation time occur because the capacitive load of the buses is changed as a result of circuit cards being either added or removed. Unfavorable conditions in flexible system configurations are due to the fact that the maximum delays have to be permanently and constantly considered by the timing means even in cases in which the delay time is reduced as a result of a smaller number of circuit cards SK being used in the bus system, so that the capacitive load on the lines is actually decreased. This, in turn, leads to time losses which reduce the processing speed of the system.

Figure 1:
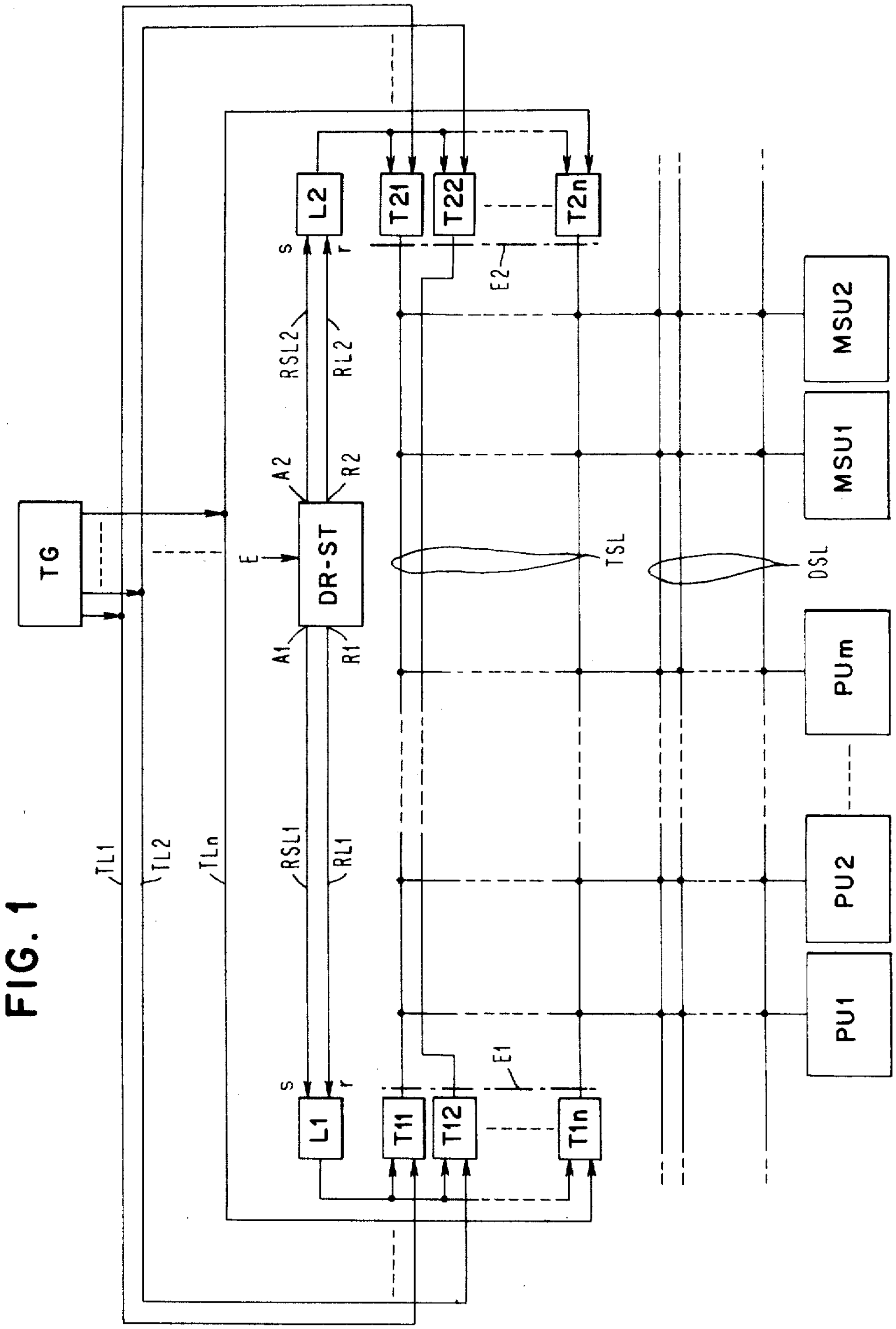
FIG. 1 is a block diagram of a modular data processing system with timing pulses controlled in accordance with the invention.

Referring now to FIG. 1, a block diagram of a data processing system in accordance with the present invention can be seen. In the system timing pulse generator TG, which may be of the type disclosed in "IBM Technical Disclosure Bulletin," Vol. 4, No. 8, January, 1962, pp. 28 to 30, produces the basic timing signals and in the usual manner a number of timing pulses are derived from the basic clock. This pulse generator is located approximately in the center of the system; which means, it is connected to the mid point of the timing pulse lines TL1 to TLn. The buses TSL for the transmission of the timing signals and DSL for the transmission of the data signals are operated in parallel and have approximately the same propagation time characteristics. These characteristics are essentially governed by the respective capacitive load on the lines.

Each line of the timing pulse bus TSL is fed with timing signals from both ends since each line of the bus TSL is associated with two gate circuits T11 and T21. The timing pulses are transmitted from the timing pulse generator TG to a particular line of the bus TSL via a particular gate circuit, for example, gate circuit T11. The gate circuits are controlled by the output signals of a data direction control DR-ST which generates a complementary signal on lines RSL1 and RSL2. This signal is dependent upon the direction of transmission of the data signals which must be checked for this purpose. The complementary output signal sets either the latch circuit L1 or the latch circuit L2. A complementary signal is used for safety reasons for the signal transmitted via lines RSL1 and RSL2 can also be transferred to to the resetting inputs of the latch circuits L1 and L2, so that one circuit (L1) is set while the other one (L2) is reset and vice versa.

The output signals of these latch circuits L1 and L2 control the gate circuits on one side, that means that latch circuit L1 controls gate circuits T11 to T1n and latch circuit L2 controls gate circuits T21 to T2n. In this manner it is determined from which side the timing signals are to be fed to the buses TSL.

As previously mentioned, a control DR-ST is provided which checks the direction of transmission of the data on bus DSL. An example of this would be an associatively addressed table in which the addresses for each combination of receiving and sending units in a system are stored along with the appropriate signals to the latches L1 and L2 for that combination. Then, when the addresses are read into the DR-ST unit the proper pulses will read out of the unit to the latches L1 and L2. The use of an associative table to address what is known about the stored data in order to obtain what is unknown is well known as evidenced by the introductory paragraph in U.S. Pat. No. 3,609,702. To this end it is advantageous to determine the proposed direction of transmission prior to the data being actually transmitted. This can be done, for example, at the time when the priority of the individual processing units PU1 to PUm and the storage units MU1 and MU2 is checked and allocated. Thus, assume that data is to be transmitted from storage unit MSUZ, which may be of the type shown in British Patent Specification No. 1,225,253, to processing unit PU1, also of the type shown in British Patent Specification No. 1,225,253. Subsequently, data control DR-ST will generate a complementary output signal on its two outputs A1 and A2 so that, in this case, output A2 receives a binary "1" signal while a binary "0" signal is applied to output A1. The binary "1" signal on line RSL2 causes latch circuit L2 to be set. In this state circuit L2 generates a control signal on its output that opens gate circuits T11 to T1n on its side, which subsequently pass the timing signals, so that the latter reach the corresponding lines in bus system TSL.

Data control DR-ST, which is connected to the operation control of the electronic data processing system via its input E, produces resetting signals on its outputs R1 and R2 upon completion of data transmission. These resetting signals are transferred by resetting lines RL1 and RL2, to the resetting inputs *r* of the latch circuits L1 and L2, causing the latter to be reset to their "0" state. In this state, the output signal of the latch circuits L1 and L2 disappears, preventing the connected gate circuits from the transmission of further timing signals.

Figure 2:
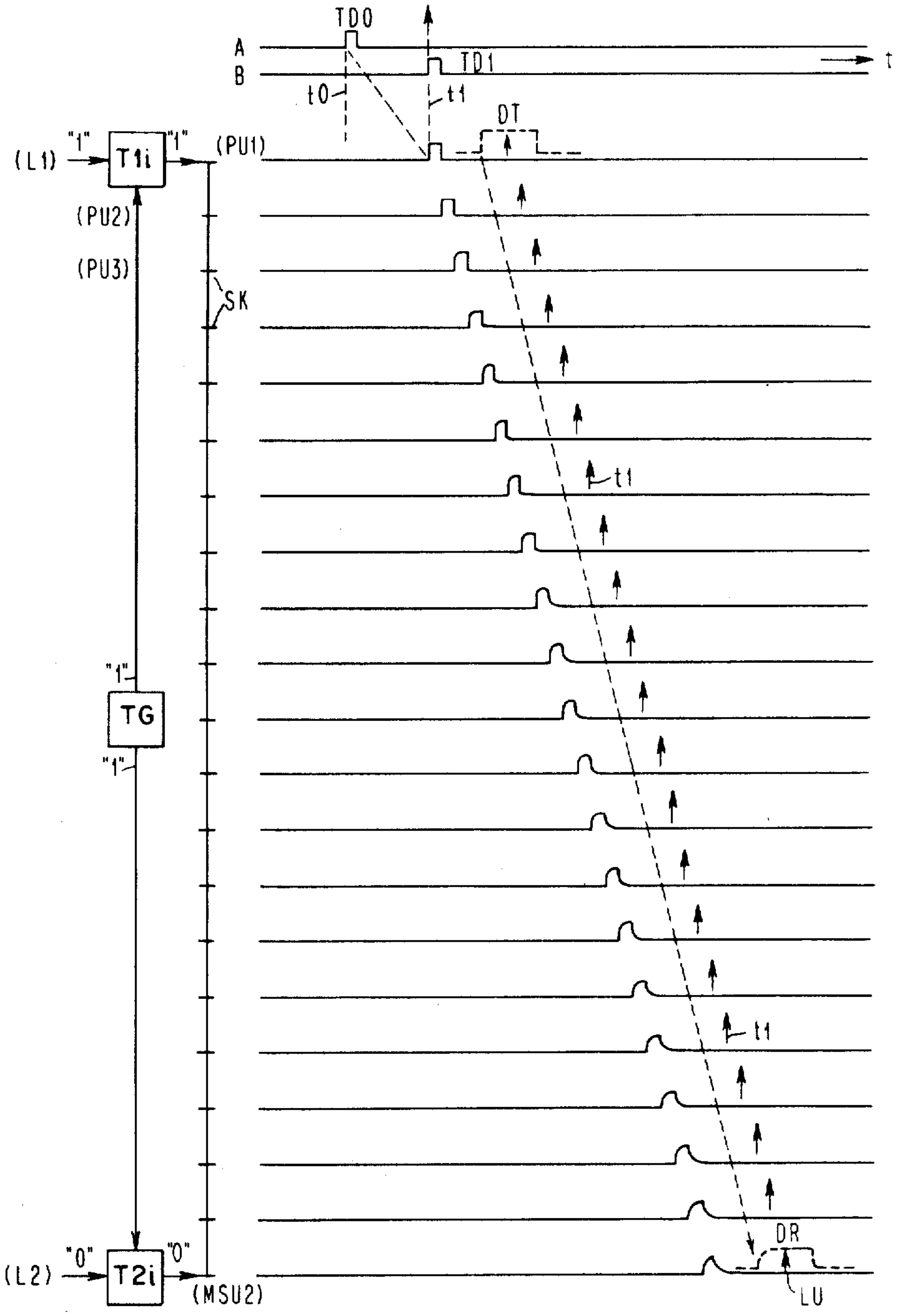
FIG. 2 is a schematic pulse diagram explaining the propagation time conditions in a data processing system of FIG. 1, in which all circuit cards are inserted in the bus system.

The arrangement of FIG. 1 thus permits timing signals applied to that end of the timing clock bus TSL which is closest to a processing unit that is the next to emit data. FIG. 2 shows the effect of this on a system configuration in which all circuit cards SK, that means, all processing units, are inserted in the bus system of an arrangement in accordance with FIG. 1. Like in FIG. 5, line A in the top part of FIG. 2 shows TD0 emitted by pulse generator TC at the time t0. This pulse can be used to cause data to be transmitted. Timing pulse TD1, controlling the data received, occurs at time T1 as shown in line B. The time position of the leading edge of the timing pulses after the propagation time, as indicated, is symbolized by a vertical arrow. This time position represents the earliest possible time at which a latch circuit (not shown) associated with a particular processing unit, or a group of latch circuits, may be set to receive data. As in FIG. 5, the setting time of the latch circuits (not shown) is marked by LU. In contrast to the previous example, FIG. 2 shows data being transmitted from the processing unit PU1 to the main storage unit MSU2. Data transmission direction control DR-ST has thus set latch circuit L1 which then transmits a "1" output signal to gate circuit T1i. The output signal of the timing clock generator TG, which is also a "1" signal, opens that gate which is an AND gate, so that the timing signal can be transferred to the timing clock line associated with T11. In the arrangement of FIG. 1 the timing pulse propagates itself from left to right, the same being applicable to FIG. 2, whereby the individual phases of propagation, viewed from top to bottom, are shown in their progressive sequence.

A comparison of FIGS. 2 and 5 shows that the propagation time differences of data and timing signals must be subject to a tolerance to ensure satisfactory data transmission between the receiver and the transmitter. When timing pulses are fed in the usual manner, as is shown in FIG. 5, to the center of the timing signal buses TSL, the signals propagate themselves to the right and left of the feeding point M. The pulse TD0 which, at the time t0 is transmitted from the center of the line to both ends, reaches the transmission control gates of the processing unit PU1 at the time t01, causing a data signal to be transmitted to the main storage unit MSU2 via the data bus at the time DT. This data signal can only be latched in the latch circuits of the receiving register in the main storage unit MSU2 at a time LU when the maximum delay time of the systems is taken into account as a tolerance. The data signal is received at time DR.

Conditions are different for the timing system in accordance with the invention, as is shown in FIG. 2. As the data signals pass along the data bus DSL at the same delay and in the same direction as the timing signals propagate themselves on the timing clock bus TSL, the timing signals reach the receiver in time to open the receiving gate circuits, thus causing the said latch circuits to be set in the receiving register. The figure shows that data transmission on the transmitter and receiver is controlled by timing signals which are not exactly synchronous but which are separated from each other by the duration of the propagation time between the data transmitter and the receiver.

These conditions are also maintained when the number of the connected circuit cards in the system deviates from the maximum possible one, such as in the case of a flexible system configuration. This is shown very clearly in the schematic representation of FIG. 3 which is based on a system configuration consisting of the processing units PU5, PU6, PU9, PU10, PU11 and the main storage unit MSU1. In the illustrated example, data transmission is to be effected from the processing unit PU5 to the main storage unit MSU1.

Figure 3:
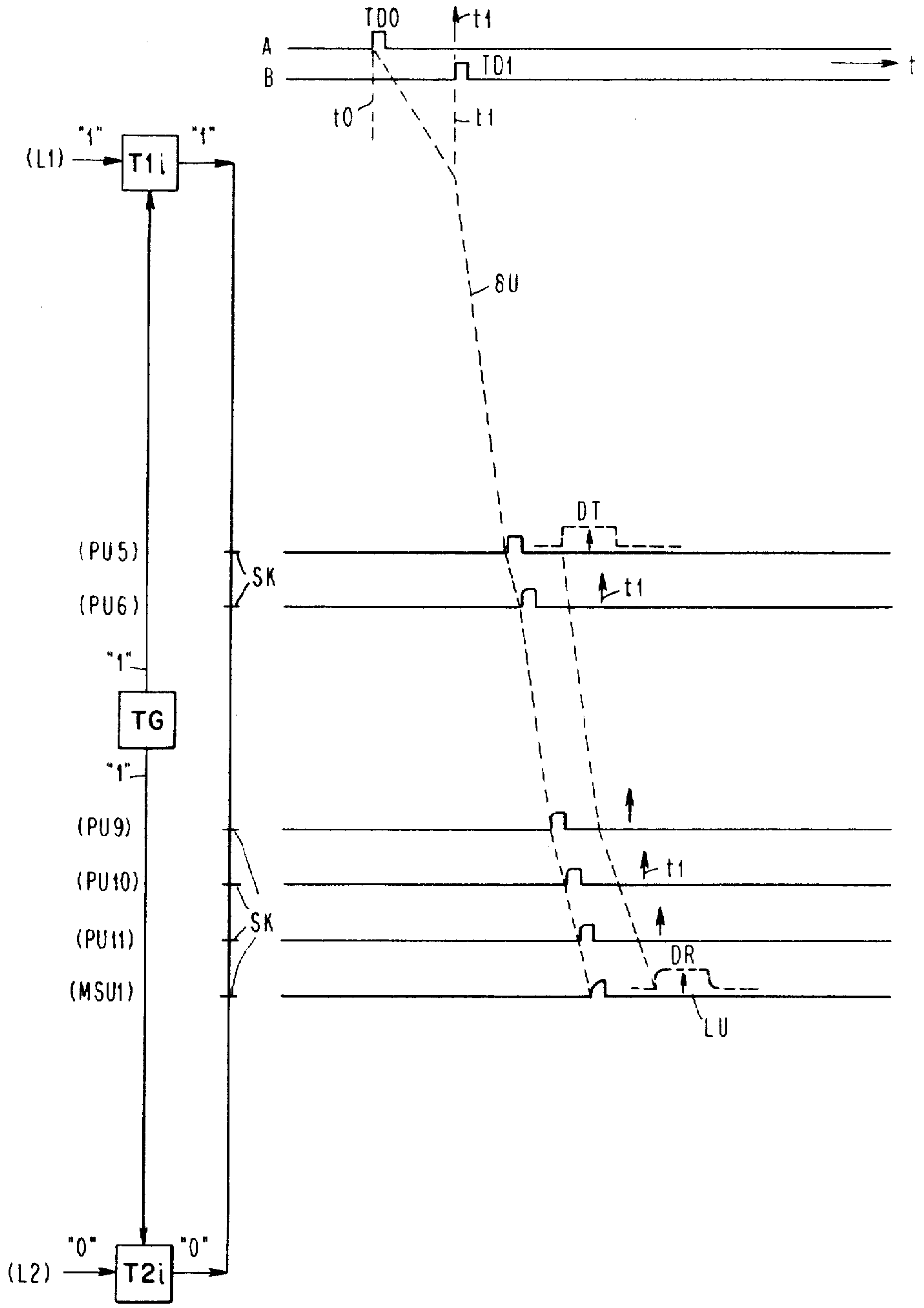
FIG. 3 is a schematic pulse diagram representing the propagation time conditions in an electronic data processing system of FIG. 1 in which only some circuit cards are inserted in the bus system.

As is shown in FIG. 3, timing clock generator TG generates a timing signal TD0 at the time t0, which is transmitted to the gate circuits on both sides. The data transmission direction control DR-ST shown in FIG. 1 has in the meantime determined the direction of transmission and set latch circuit Li accordingly. Latch circuit L2 remains in its OFF state so that gate circuit T11 is opened for the transmission of the timing pulse TD0, while gate circuit T21 remains closed. The pulse time diagram in FIG. 3 shows the delay time t1-t0 which elapses from the time pulse TD0 and is generated until its application to the left end E1 (FIG. 1) of the timing bus TSL. This is followed by an unloaded line section having a relatively short delay U which extends from the feeding point to the connection of the processing unit PU5. This section, in its turn, is followed by one in which there is a noticeable increase in the delay as a result of the load imposed by processing units PU5 and PU6. The latter section is followed by a low-delay section which eventually terminates in a high-delay section extending from the connection of the processing unit PU9 to the main storage unit MSU1 and which, as a result of the load imposed by these units, has a higher propagation time delay.

Transmission of the data signals at the time DT, which is initiated by timing pulse TD0, is terminated at the time LU which identifies approximately the center of the data signal received.

A comparison of FIGS. 2 and 3 with FIG. 5 shows that, with a timing control in accordance with the invention, the spacing of the timing pulse with respect to the data signal is constant at each point of the two buses TSL and DSL, while in the illustrated prior art arrangement it is first variable and then constant.

In concluding, it is pointed out that for the timing control in accordance with the invention the delay times are mutually compensating, this compensation being effective for all kinds of system configurations, that means for any load imposed.

Therefore, while the invention has been shown and described with respect to a preferred embodiment thereof, it will be understood by those skilled in the art that various changes in form and detail may be made therein without departing from the spirit and scope of the invention.

What is claimed is:

1. A system for the distribution of timing pulses in a data processing system having a plurality of processing units connected to each other and at least one memory along lines in both the data pulse bus and timing pulse bus networks, comprising:

a timing pulse generator means;

control gate pair means for coupling the timing pulse generator means to the individual lines of the timing pulse bus network with one control gate in each gate pair linking one end of a line of the timing pulse bus network to the timing pulse generator and the other gate in that pair linking the other end of the same line to the timing pulse generator;

latch circuit means coupled to said gate pair means to provide a gating signal to only one gate in each pair to open the gate to timing pulses from the timing pulse generator; and transmission control means for controlling the production of the gating signal by the latch circuit means in response to the direction of transmission of the data signals on the data bus and causing the latch means to provide a signal to the gates in the gate pair that permits transmission of timing signals along the timing pulse bus network in the same direction as the data is being transmitted along the data pulse bus network.

2. The system of claim 1 wherein the timing bus system and the data bus system have essentially identical propagation time characteristics.

3. The system of claim 2 including feed line means coupling the timing pulse generator to the control gate pairs by electrically equally distant paths.

* * * * *